United States Patent [19]

Pangonis

[11] 4,059,667
[45] Nov. 22, 1977

[54] BIAXIALLY ORIENTED POLYETHYLENE TEREPHTHALATE FILM AND METHOD OF MAKING SUCH FILM

[75] Inventor: William James Pangonis, West Chester, Pa.

[73] Assignee: E. I. Du Pont de Nemours and Company, Wilmington, Del.

[21] Appl. No.: 624,256

[22] Filed: Oct. 20, 1975

[51] Int. Cl.$^2$ .......................... B29D 7/24; B29D 7/00
[52] U.S. Cl. .................................. 264/289; 260/75 T
[58] Field of Search ........................................ 264/289

[56] References Cited

U.S. PATENT DOCUMENTS

| | | | |
|---|---|---|---|
| 2,784,456 | 3/1957 | Grabenstein | 264/288 |
| 2,928,132 | 3/1960 | Richards | 264/289 |
| 3,187,075 | 6/1965 | Seifried et al. | 264/289 |
| 3,547,748 | 12/1970 | D'Onofrio et al. | 264/289 X |
| 3,631,899 | 1/1972 | Erickson | 264/289 X |
| 3,702,357 | 11/1972 | Smith | 264/289 |
| 3,873,664 | 3/1975 | Curtis et al. | 264/289 X |
| 3,903,294 | 9/1975 | Abella | 264/289 |

Primary Examiner—Lucille M. Phynes

[57] ABSTRACT

A biaxially oriented polyethylene terephthalate film suitable for making heat-shrinkable bands is provided having machine direction shrinkage, on heating to 100° C. for 5 seconds, of less than 8%; cross-machine direction shrinkage, on heating to 100° C. for 5 seconds, of greater than 40%; and a minimum shrink force at 100° C. of greater than 200 psi.

The film further, and variously, has substantially 0% crystallinity; substantially 0% shrinkage at 78° C.; a maximum gauge deviation of less than 15%; an elongation at break of at least 25% and a tensile strength of at least 6000 psi; haze of less than 8%; and a modulus of at least 200,000 psi.

A method of making such film is provided in which the film is heated, after machine direction stretching and prior to cross-machine direction stretching, to an intermediate temperature (from 100° to 105°) slightly above the temperature at which it is first stretched, to essentially remove machine direction shrinkage.

6 Claims, 1 Drawing Figure

BIAXIALLY ORIENTED POLYETHYLENE TEREPHTHALATE FILM AND METHOD OF MAKING SUCH FILM

BACKGROUND OF THE INVENTION

1. Field of the Invention

The field of art to which this invention pertains is plastic shaping and, more specifically, it involves the mechanical shaping of polyethylene terephthalate film by stretching it, first in the machine direction, followed by heating without stretching, then cross-machine direction stretching to make a heat-sealable, biaxially oriented film suitable for use in making heat-shrinkable bands.

2. Description of the Prior Art

Numerous uses for heat-shrinkable films exist, most of which have specific property requirements for a particular use. For example, many packaging uses require balanced shrinkage, as disclosed in U.S. Pat. Nos. 2,928,132 to Richards, and 3,187,075 to Seifried et al., while other uses, such as heat-shrinkable bands to seal closures, such as on bottles, require film which shrinks predominantly in one direction, as disclosed in U.S. Pat. No. 2,784,456 to Grabenstein.

Known films of this latter type have been suitable for fulfilling requirements in a most rudimentary way, but as application technology has become more refined, and requirements in use more stringent, needs for improvements have become apparent. For instance, it has been a challenging problem to provide in a single film all of the desired properties required for this type use, such as toughness coupled with proper shrinkage. Often, in obtaining sufficient shrinkage and shrinkage force around the circumference of the band to enable it to shrink around unusual neck configurations and into the innermost depressions thereof, excessive shrinkage is placed in the band in its width direction, causing wrinkles and the like during shrinkage. If the band is oriented only in the circumferential direction to help solve this problem, adequate toughness in the film is generally impossible to obtain and, further, known methods for making this type film in which the film is uniaxially oriented, as in Grabenstein, are costly to operate due to decreased production speeds.

SUMMARY OF THE INVENTION

Briefly and broadly described, the method of this invention includes the stages of stretching and orienting an amorphous polyester film in the machine direction at a first temperature above its glass transition temperature, heating the stretched film to a temperature slightly above such first temperature while maintaining the film free of applied stretching forces for a time sufficient to remove substantially all residual shrinkage at 100° C. therein, thereafter stretching the film in the cross-machine direction at substantially the same temperature as the first temperature, and finally cooling the film rapidly to below its glass transition temperature.

More specifically, the method of such invention includes the steps of stretching an amorphous polyethylene terephthalate film of a viscosity of at least 0.55 in the machine direction from 1.5 to 2.0 times its initial length at about 80° to 90° C., engaging the film in the clips of a tenter chain in a tenter oven, heating the film to a film temperature from about 100° to 105° C. without stretching, thereafter stretching the film in the cross-machine direction in the tenter frame from 3.2 to 3.5 times its width after machine direction stretching at about 88° to 90° C. and immediately cooling the film below its glass transition temperature without stretching or relaxation. Typical properties of a film so produced are:

| | |
|---|---|
| MD Shrinkage at 100° C. | less than 8% |
| TD Shrinkage at 100° C. | greater than 40% |
| Shrinkage at 78° C. | 0 |
| Maximum gauge deviation | less than 20% |
| Crystallinity | 0 |
| Minimum Shrink Force 100° C. | greater than 200 psi (14 kg/cm$^2$) |
| Toughness | Greater than 10% elongation at break, tensile, 6,000 psi |
| Haze | less than 8% |

These film properties, and the method by which and through which they are obtained give to the art a capability heretofore not available to it. For example, contrary to expectations, the foregoing method enables the production of a shrinkable film with the novel properties of a high degree of shrinkage and shrink force in the one direction, very low or essentially no shrinkage in the other direction, the film nonetheless, and surprisingly, having essentially no crystallinity, and the toughness of a biaxially oriented film.

It is hypothesized, but not considered binding, that some of these unique properties are the result of intermediate heating, between machine and cross-machine direction stretching, which relaxes the "metastable" orientation which is responsible for shrinkage that occurs in initial, or short periods (up to 5 seconds) of heating at 100° C. The remaining orientation provides toughness to resist further orientation, caused by "neck-in" forces, in this direction during second cross-machine direction stretching, and provides "biaxial" toughness in the film after such cross-machine direction stretching. This relaxation of the first machine direction orientation provides a structure with compacted amorphous coils which inhibit crystallization during stretching in the second direction, and permit such stretching to be conducted to an extent that a highly strained taut amorphous structure is formed, resulting in a high degree of shrinkage, and high shrinkage force. The presence of highly compacted amorphous regions in the oriented structure, rather than "voids", usually associated with unoriented amorphous structures results in a potential barrier on a high activation energy of molecular motion so that the film is substantially free of shrinkage at about 89°-80° C., but shrinks readily at temperatures of about 100° C. This structure results in a surprising combination of properties ideally suited for shrinkable bands for closures, such as on bottles and the like and gives to art improvements it has long sought.

DESCRIPTION OF THE PREFERRED EMBODIMENT

Figure 1:
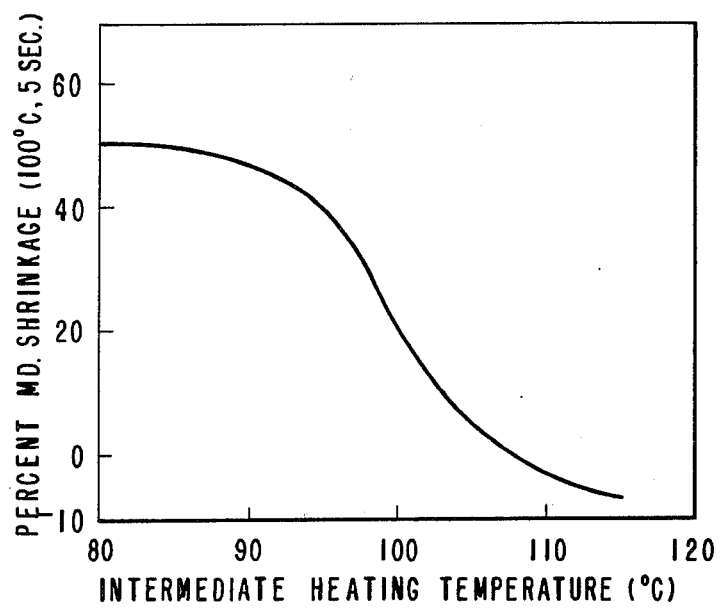
FIG. 1 is a graph showing the percent machine direction shrinkage of film made according to this invention, at 100° C. for 5 seconds, resulting from various intermediate (i.e., after machine direction and before cross-machine direction stretching) heating temperatures.

A preferred method of making an improved film for use in making heat-shrinkable bands includes the steps of:

casting polyethylene terephthalate material onto a quenching surface;

forming amorphous polyethylene terephthalate film on such surface;

stripping such amorphous polyethylene terephthalate film from such surface, such amorphous polyethylene terephthalate film having a viscosity of at least 0.55;

stretching such amorphous film in the machine direction from 1.75 to 2 times its initial length while such film is at a first temperature of between about 88° to 90° C. to orient the film in that direction;

engaging the thus stretched film in the clips of a tenter chain in a tenter frame;

intermediately heating the film to a second temperature of about 105° C. without stretching while in the tenter frame;

thereafter stretching the film transversely in the tenter frame from 3.2 to 3.5 times its width while such film is at a temperature of between about 88° and 90° C.;

and cooling the film below 78° C. without stretching or relaxation.

More broadly, and to stress the key steps, such method includes the steps of:

stretching amorphous polyethylene terephthalate film in a first direction at a first temperature slightly above the glass transition temperature of the film to provide molecular orientation in that direction;

heating the thus oriented film to a temperature slightly higher than such first temperature for a time sufficient to partially remove such orientation; and thereafter stretching the film in a direction transverse to the first direction thereby to make a biaxially oriented polyethylene terephthalate film.

This tough film is ideally suited for making heat-shrinkable bands (which bands may be made by folding the flat film into a tube and heat-sealing parts of the substantially amorphous film to other parts of such film) and it gives to that art the capability of having the high cross-machine direction shrinkage and shrinkage force required to provide the circumferential shrinking necessary when forming a tight, wrinkle-free seal around a bottle cap, for example, without having the disadvantage of high machine shrinkage expected for such films which, of course, would preclude proper sealing. To get all these properties in a single film is the touchstone of this invention.

The film, in addition to having these highly sought after, and apparently mutually-exclusive, toughness/shrinkage properties, as will be seen also gives still other improvements to the shrinkage band arts.

As a matter of background, and for better understanding of the need for improvements in this art, film for shrinkable bands for sealing caps on containers, for example, is usually made by stretching film in a single direction, transverse to the long axis machine direction of the continuous film. Such uniaxially oriented film, as taught by Grabenstein, is not subjected to the usual heat setting; accordingly, upon subsequent heating to a temperature at or above the stretching temperature it will tend to shrink or recover its original dimensions in the direction of stretch. Prior to shrinking stretched film is slit into narrow strips and folded and sealed, preferably heat-sealed, at the coextensive slit edges to form a flattened tube. Short sections of this flattened tube are opened to form a substantially circular tube and slipped over parts of a package or over the neck of a closed container, such as a capped bottle, for example, cut to the proper length and heated, whereupon the tube shrinks. The band as thus formed should shrink only in the circumferential direction, with essentially no shrinkage in the orthogonal or width direction, to assure a tight, wrinkle-free, pilfer-proof seal.

The major deficiencies of previously available films for shrinkable bands, as characterized by those made according to the teachings of Grabenstein, are insufficient cross-machine direction in film (or circumferential shrinkage force in the band) also having machine direction or width shrinkage within acceptable limits (i.e., below about 8% at 100° C.), poor gauge uniformity, a lack of toughnes and poor productivity, since without machine direction stretching, ultimate line speeds are slow, and stretch ratios are limited, making the production costs economically unattractive. Toughness properties (tensile, tear, etc.) in these one-way or uniaxially oriented film are increased in the direction perpendicular to direction of orientation only, e.g. one way oriented polyethylene terephthalate film tends to fibrillate in the direction of orientation; but overall toughness for handling and in use is lacking. Certain other properties which require attention in property modification are those common to oriented polyester film in general, such as poor, or unreliable heat seals, and a property common to all heat-shrinkable films, "shrinkage loss", or slight shrinkage occurs, such as at the lower temperatures encountered during processing steps prior to shrinkage of the film as a sealing band.

The phenomenon of "shrinkage loss", the moderate degree of shrinkage at temperatures lower than the practical shrinkage temperature, i.e., 100° C., is a source of inefficient utilization of shrinkage and wrinkling of the shrinkable tube before application onto the container to be sealed. This shrinkage occurs upon printing labels or other indicia on the film or bands before application to the container, upon use of slightly elevated temperatures, e.g., 80° C., to speed drying of printing inks or during storage. Hence, this must be a consideration in any proposed modification of the film or the process to make it.

A survey of the factors which lead to these deficiencies, factors which often oppose each other upon adjustments in an effort to produce an acceptable film for making bands, makes it appear, outwardly, that a solution to these problems is a virtual impossibility. It is believed, for example, that cross-machine direction shrinkage force should increase with increased stretching in that direction but increasing such stretching (stretch ratio), according to Grabenstein, instead decreases cross-machine direction shrinkage while machine direction shrinkage is increased beyond tolerable limits. Further, low degrees of cross-machine direction toughness, which result in frequent film breakage in slitting and processing, are characteristic of uniaxially oriented polyester films of normal molecular weight (i.e., an intrinsic viscosity of 0.55 to 0.65 in 60/40 phenol/tetrachloroethane — as determined by methods disclosed in U.S. Pat. No. 3,627,579 to Heffelfinger, for example). To increase viscosity to higher levels inordinately increases difficulties in production and costs. To orient slightly in the machine direction in order to overcome this lack of toughness, using known techniques causes intolerable machine direction shrinkage. Poor gauge also is inherent in the limitation imposed upon the cross-machine direction stretch ratio to prevent concomittant, prohibitive machine direction orientation.

The apparent inherent nature of these deficiencies and the adverse effects on acceptable properties of method adjustments designed to eliminate them, suggests that it is highly unlikely that a heat-shrinkable film for bands with the desired balance of properties could be produced. Unexpectedly, a method employing certain key conditions contrary to all known prior art teachings has been discovered which corrects the deficiencies without harmful effect on the previously acceptable properties.

That method of making biaxially oriented polyethylene terephthalate film, as previously suggested, generally includes the steps of:

stretching amorphous polyethylene terephthalate film in the machine direction at a temperature and rate whereby such film has a machine direction shrinkage, on heating to 100° C. for 5 seconds, of between 30% to 50%;

thereafter subjecting the thus stretched film to an intermediate temperature higher than the machine direction stretching temperature while the film is under restraint whereby such film has a machine direction shrinkage, on heating to 100° C. for 5 seconds, of less than 8%; and thereafter stretching the thus heated film in the cross-machine direction at a temperature and rate whereby such film has a shrinkage in that direction, on heating to 100° C. for 5 seconds, of greater than 40%, while retaining a machine direction shrinkage of less than 8%.

By following the methods of the invention, as previously described, it is, therefore, possible to make a film having, among other properties the highly desired machine direction shrinkage at 100° C. of less than 8%; and cross-machine direction shrinkage at 100° C. of greater than 40%. The film also has a minimum shrinkage force at 100° C. of greater than 200 psi. With these very properties, the film is tough enough and will shrink enough to enable heat-shrinkable bands made from it to perform in an improved fashion in handling and in use.

As previously stated, the film of this invention is amorphous; it has substantially 0% crystallinity. This is highly unusual for a biaxially oriented film.

This amorphous property of the film serves two needs in the heat-shrinkable band art: first, it enables the film to be heat-sealed to itself in forming the band and, second, it provides a clear, strong seal. When the band is shrunk about a bottle neck, there is a tendency for a film without this property and having some crystallinity to create haze patterns at the areas of greatest concavity and also to weaken at that location.

It is essential in obtaining consistently strong heat seals on the tubes from which the shrinkable bands are cut, i.e., heat seals along edges of two flat sheets on slit lines parallel to the long axis of the sheet, laterally spaced apart at a distance equal to one half the intended circumference of the tube before shrinkage to use the proper film. To assure a heat seal with strength sufficient to withstand the shrinkage force, crystallinity must be low. The method of the present invention is especially suitable for production of extremely low levels of crystallinity, both thermally induced spherulitic crystallites and stress-induced crystallites accompanying orientation.

Spherulitic crystallinity, which causes undesirable haze, usually occurs as a result of inadequate quenching from the melt to a temperature below the glass transition temperature (about 78° C. for polyethylene terephthalate). This type of crystallization can be readily avoided by casting onto a chill roll at about 30°-50° C., employing well-known adjuncts, such as electrostatic pinning or pneumatic devices, alone or in combination, to assure adhesion to the chill roll and to provide intimate contact between the freshly cast web and the chill roll.

The conditions of the present invention for control of stress-induced crystallinity utilize lower temperature stretching than previously has been found suitable for production of uniaxially shrinkable films (as Grabenstein teaches, for example). The method of such invention enables the production of film with a crystallinity level which is substantially zero by known means of detecting and measuring crystallinity. It should be observed that the standard means of measuring crystallinity, as described in U.S. Pat. No. 2,823,421 to Scarlett, is based upon a comparison of the density of the polymer with X-ray indications of crystallinity, employing measurements on unoriented polymer. This relationship in the past has been used with oriented polymers under the assumption that any increase in density with orientation represented an increase in crystallinity. In the present invention, however, it has been observed that unoriented amorphous films, oriented under conditions of this invention (without heat setting) underwent an increase in density, but upon shrinkage at 100° C., density could decrease to a level lower than that before orientation. Obviously, no crystallites could melt at this temperature, so it has been postulated that the increase in density is a result of orientation causing the collapse of voids of the coiled chains of the amorphous unoriented polymer, to provide a more compact structure in the oriented state. Upon relaxation during shrinkage these chains recover to a state approaching the level of compaction of cast film, hence the specific volume of the chains is greater, and a lower density exists.

Based upon this observation, density values were not relied upon to determine crystallinity, but more sensitive methods with finer, more reliable resolution, such as X-ray, DTA, and infra-red spectrophotometry, were employed. These methods indicated much of the film of the present invention has no detectable crystallinity.

It is seen, then, that the film of this invention, by being substantially amorphous, solves not one but two troublesome problems in the heat-shrinkable bands art.

It is interesting to note that this amorphous state is realized in a biaxially oriented film, which is unusual and that even though the film is biaxially oriented, and retains the toughness of that type film, it is, nonetheless, essentially a one-way shrinking film, with most shrinking potential and shrinkage force being in one direction with little or no shrinkage occurring in the other direction.

In addition, the film has many other desired properties. For example, substantially 0% shrinkage occurs at 78° C., which solves the problem of "shrinkage loss", as previously described. Further, the film has a maximum gauge deviation of less than 15% and may be made at improved production rates due to the machine direction stretching; has a toughness of greater than 25% elongation at break, and a tensile strength of at least 600 psi; a haze of less than 8%; and a modulus of at least 200,000 psi. These properties, too, are important to the shrinkable band art since they permit stronger seals to be made by shrinking and permit heat-seals to be made prior to shrinking, all with improved handling and in an improved manner.

From this it is seen that many advantages are gained by and from the method that is this invention. It is also important to note that all of these advantages flow from the key intermediate step of heating the film, as it is held but not stretcheed, immediately after machine direction stretching and immediately before cross-machine direction stretching. This heating step, in essence, uses the advantages brought about by machine direction stretching (i.e., a tougher film, greater production rates, etc.) while avoiding the unwanted properties (i.e., high machine direction shrinkage, for example) or used in combination with the cross-machine direction to obtain the tough film with high cross-machine direction shrinkage and shrinkage force needed to make improved bands. The end result, then, is a biaxially oriented film that behaves like a uniaxially oriented film in certain important respects. Such a film has long been sought by the art.

The novelty, and usefulness, of these features may best be understood by referring to the teachings of Grabenstein, which is exemplary of the state of the art for making polyester film for shrinkable bands. Grabenstein warns, for example, that increasing the cross-machine or transverse direction (TD) stretch ratio (the only stretching direction disclosed) actually decreases the percentage TD shrinkage, while increasing machine direction (MD) shrinkage, which, of course, gives a contrary result to that sought in the film of the instant invention.

An evaluation was made of the dependence of TD shrinkage on TD stretching temperature. Film was stretched according to the general teachings of Grabenstein, i.e., preheating polyethylene terephthalate film to 140° C. before TD stretching the film to 2X, 3X and 4X. Results revealed that as the stretching temperature increases, not only does TD shrinkage decrease, but also the rate of decrease with temperature is greater at the higher stretch ratios.

Further, film was made following Grabenstein's teachings, and also under conditions of lower TD stretching temperatures at higher TD stretch ratios. Process conditions and results are summarized in Table I. (In the samples reported in this table, all shrinkages are based on linear shrinkage in the indicated direction upon immersion of the sample of a measured length in a heated oil bath at the indicated temperature for five seconds unless otherwise stated. Shrink forces were determined on a one-inch wide sample clamped to a piezo-electric crystal with force-indicating means so that the length of film exerting the shrink force was one inch long.)

From Table 1, it can be seen that conditions of preparation of samples 1 and 2, substantially unmodified from Grabenstein, resulted in film of insufficient TD shrinkage force, poor gauge uniformity (i.e., high deviation), poor productivity and unsatisfactory toughness. Utilization of the relationship of shrinkage, stretch ratio and temperature suggested TD stretching at higher stretch ratio levels and at lower temperatures. As seen in sample 3, not only did this cause the percentage shrinkage to increase, but also the TD shrinkage force increased. Further, gauge deviation was decreased. Other properties, however, especially high MD shrinkage, were unsatisfactory.

To determine the effect of intermediate heating on polyethylene terephthalate film properties, film samples were stretched at 88° to 90° C. to twice their length in the machine direction, and heated without stretching in a tenter frame for five seconds, prior to TD stretching. FIG. 1 graphically illustrates the percentage MD shrinkage (5 seconds at 100° C.) as a function of intermediate heating temperature. It can be seen that heating to no more than the apparent glass transition temperature of the film, about 78° C., leaves substantially the theoretical shrinkage in the film, i.e., it relaxes very little toward its unstretched dimensions. As temperature was increased, part of the residual shrinkage was removed, so that at 105° to 110° C. the film had no machine direction shrinkage, and even would expand slightly under heat-shrinking conditions if intermediate heating temperatures were slightly higher.

Sample 5, in Table II, was made using a lower intermediate heating temperature. Surprisingly, after TD stretching to a higher TD stretch ratio at such lower temperature, it had essentially no MD shrinkage, but toughness and productivity remained poor. Accordingly, since intermediate heating could control MD shrinkage, a run was made to determine the effect of purposeful MD stretch ing before intermediate heating. Sample 6, which was made during this run, was first stretched in the MD at 85° to 90° C. to 1.75 its length, and thereafter heated and stretched under essentially the same conditions of sample 5. Unexpectedly, the product had no MD shrinkage, but a residual effect of the MD stretching imparted good toughness to the film, with little more than a nominal, insignificant reduction in shrinkage force. Intermediate heating tends to slow down the rate of relaxation but does not relax out all of the MD orientation. Thus, the 5 second shrinkage is drastically reduced, but sufficient orientation remains to impart toughness.

Accordingly, a process has evolved including an MD stretching step, followed by intermediate heating

TABLE I

| | PROCESS | | | | PROPERTIES | | | | | | |
|---|---|---|---|---|---|---|---|---|---|---|---|
| Sample | MDX | IH | TDX | TD | TDS | MDS | TDF | GD | PRO | TGH | NOTES |
| 1 | 1.0 | 120 | 2.0 | 120 | 30 | 8 | 0 | ±40 | 2 | poor | (a) |
| 2 | 1.0 | 120 | 2.0 | 120 | 48 | 5-8 | 0 | ±40 | 2 | poor | (b) |
| 3 | 1.0 | 120 | 3.0 | 83 | 50 | 11 | 800–1000 | ±20 | 3 | poor | |

Legend
MDX = Machine direction stretch ratio
IH = Intermediate heating temperature of film before transverse stretching (° C.)
TDX = Transverse direction stretch ratio
TD = Transverse direction stretching temperature (° C.)
TDS = Transverse direction shrinkage, percentage
MDS = Machine direction shrinkage, percentage
TDF = Transverse direction shrinkage force, psi
GD = Gauge deviation
PRO = Productivity based on the factor by which cast film area is increased
TGH = Toughness
Notes
(a) Shrinkage on this and all except sample 2 at 100° C
(b) Shrinkage at 150° C

TABLE II

| | PROCESS | | | | | PROPERTIES | | | | | |
|---|---|---|---|---|---|---|---|---|---|---|---|
| Sample | MDX | IH | TDX | TD | TDS | MDS | TDF | GD | PRO | TGH | NOTES |
| 4 | 2.0 | — | — | — | — | 50 | — | — | 2 | — | (a) |
| 5 | 1.0 | 105 | 3.0 | 85 | 50 | 0 | 800 | ±20 | 3 | poor | (b) |
| 6 | 1.75 | 105 | 3.2 | 85 | 50 | 0 | 600 | ±20 | 5.6 | good | |

Legend
MDX = Machine direction stretch ratio
IH = Intermediate heating temperature of film before transverse stretching (° C.)
TDX = Transverse direction stretch ratio
TD = Transverse direction stretching temperature (° C.)
TDS = Transverse direction shrinkage, percentage
MDS = Machine direction shrinkage, percentage
TDF = Transverse direction shrinkage force, psi
GD = Gauge deviation
PRO = Productivity based on the factor by which cast film area is increased
TGH = Toughness
Notes
(a) Shrinkage on this and all except sample 2 at 100° C
(b) Shrinkage at 150° C before TD stretching to a temperature to remove residual shrinkage, followed by TD stretching at approximately the same as the MD temperature, but lower than the prior art temperatures. This enables stretching at a higher stretch ratio without imparting excessive MD shrinkage. The MD stretching can also double the overall productivity as well, as adding to toughness. And, the higher TD stretch ratio increases TD shrinkage and shrink force, improves gauge uniformity and significantly increases productivity by area increases, all desired improvements.

In a typical method of making the film of this invention, amorphous polyethylene terephthalate film is stretched in the machine direction using slow and fast nip rolls, as taught by the U.S. Pat. Nos. 3,788,127 to Peet or 2,823,421 to Scarlett, both of which are incorporated by reference herein. After stretching, the film is moved into a tenter frame, of the type as taught by Scarlett, for example, which essentially comprises two sets of tenter clips attached to continuously moving endless belts. The tenter clips grasp the edges of the machine-direction stretched film and initially move it in a parallel direction while it is intermediately heated in the tenter frame at a temperature of about 105° C. During the time the film is exposed to this temperature, which lasts for about 5 seconds, the film is maintained under constant tension so that dimensional changes in either direction is prevented, i.e., the clips do not diverge and tension on the film in the longitudinal direction is kept constant. Following this intermediate heating, the film is brought to a lower, second direction stretching temperature, and the rails diverge, stretching the film in the cross-machine direction, preferable to three or more times its width.

It is seen, then, of major importance to the method of the instant invention is the step of heating the film to a stabilizing temperature after MD stretching and before TD stretching. This intermediate heating step unexpectedly plays a major role as to the properties of the previously stretched film and in obtaining the properties of the film as stretched after heating.

For example, as has been mentioned, the film is first stretched in a machine direction at a temperature from its glass transition temperature (Tg) to 25° above its Tg. By stretching such film in the machine direction it is possible to make the film faster in that you are increasing the line speed by which it is made in doing. Also, there is placed in the film orientation which plays a role not only in its shrinkage but finally in its strength. In making heat-sealing bands, it would seem undesirable to those skilled in the art to positively place in the film MD orientation in that it is known that successful seals can be made from film only if the MD shrinkage is low; it must be lower than 8%. It further is known that any TD stretching that occurs after MD stretching generally also increases machine direction orientation and, therefore, machine direction shrinkage. Accordingly, it has been the practice of the past in making film for heat-shrinkable bands to make uni-directionally oriented film (one that is not oriented in the machine direction) to accomplish this objective.

Surprisingly, it has been found that by placing MD orientation, as above-described, in the film it is then possible using the key intermediate heating step as the means to relax the MD shrinkage to a point where such MD shrinkage is below that required in the final film while at the same time leaving in the film sufficient orientation for toughness and for other required, or desired, properties in film for heat-shrinkable bands.

Accordingly, it has been found that by heating the film after it has been MD stretched to a slightly higher intermediate temperature than that at which it was stretched while restraining the film using tenter clips for example, it is possible to relax out much of the MD shrinkage properties while retaining the strength and other advantages that orientation gives in the film. This discovery is the touchstone of the instant invention.

I claim:
1. A method of making biaxially oriented polyethylene terephthalate film including the steps of:
   stretching amorphous polyethylene terephthalate film in a first direction about 1.2 to 2 times its initial length at a first temperature slightly above the glass transition temperature of the film to provide molecular orientation in that direction;
   heating the thus oriented film to a temperature slightly higher than such first temperature for a time sufficient to partially remove such orientation while maintaining the film in a substantially amorphous state; and
   thereafter, cooling the film to a temperature substantially the same as the first temperature and
   stretching the film in a direction transverse to the first direction about 3 to 4 times its width before stretching whereby such film has a shrinkage, on heating to 100° C for 5 seconds, of less than 8% in the first direction and greater than 40% transverse to the first direction.

2. A method of making biaxially oriented polyethylene terephthalate film including the steps of:

stretching amorphous polyethylene terephthalate film heated to a temperature slightly above its glass temperature in a first direction about 1.2 to 2 times its initial length to orient it uniaxially;

heating such uniaxially oriented film to a stabilizing temperature from about 100° to 105° C in a tenter frame without stretching after it has been stretched in the first direction and before it is stretched in a second direction;

thereafter, cooling the film to a temperature substantially the same as the first temperature;

stretching the film in the second direction in the tenter frame about 3 to 4 times its width before stretching to orient it in that direction; and cooling the film below its stretching temperature after stretching in the second direction in the tenter frame whereby such film has a shrinkage, on heating to 100° C for 5 seconds, of less than 8% in the first direction and greater than 40% in the second direction.

3. A method of making biaxially oriented polyethylene terephthalate film including the steps of:

stretching amorphous polyethylene terephthalate film in the machine direction (MD) at a temperature and rate whereby such film has a MD shrinkage, on heating to 100° C. for 5 seconds, of between 30% to 50%;

thereafter subjecting the thus stretched film to a temperature higher than the MD stretching temperature while the film is under restraint whereby such film has an MD shrinkage, on heating to 100° C. for 5 seconds, of less than 8%; and thereafter stretching the thus heated film in the cross-machine direction (TD) at a temperature and rate whereby such film has a TD shrinkage, on heating to 100° C. for 5 seconds, of greater than 40%.

4. A method of making heat-shrinkable, heat-sealable polyethylene terephthalate film including the steps of:

stretching amorphous polyethylene terephthalate film in a machine direction about 1.2 to 2 times its initial length at a temperature from slightly above its glass transition temperature to 25° C. above such glass transition temperature;

heating such stretched film to an intermediate temperature higher than the temperature of the MD stretching temperature while restraining the film from the shrinkage by engaging it along its edges whereby to relax the stretched film;

stretching such relaxed film in a cross-machine direction while heating it to a temperature lower than the intermediate temperature and stretching it to about 3 to 4 times its width before stretching; and cooling the film rapidly to a temperature below its glass transition temperature.

5. A method of making heat-sealable, heat-shrinkable, biaxially oriented polyethylene terephthalate film including the steps of:

stretching an amorphous polyethylene terephthalate film of a viscosity of at least 0.5 in the machine direction from 1.5 to 2.0 times its initial length at a temperature from between about 78° to 95° C.;

engaging the thus stretched film in the clips of a tenter chain in a tenter frame;

subjecting the film to a temperature of from 100° C. to 105° C. without stretching;

thereafter stretching the film in a cross-machine direction in the tenter frame from 3.2 to 3.5 times its width after machine direction stretching at a temperature from between about 82° to 92° C.; and immediately cooling the then stretched film below 78° C. without stretching or relaxation.

6. A method of making biaxially oriented polyethylene terephthalate film including the steps of:

casting polyethylene terephthalate film onto a quenching surface;

forming amorphous polyethylene terephthalate film on such surface;

stripping such amorphous polyethylene terephthalate film from such surface, such amorphous polyethylene terephthalate film having a viscosity of at least 0.55;

stretching such amorphous film from 1.5 to 2 times its initial length while such film is at a temperature of between about 88° to 90° C.;

engaging the thus stretched film in the clips of a tenter chain in a tenter frame;

heating the film to a temperature of from about 100° C. to 105° C. for approximately 5 seconds without stretching while in the tenter frame;

thereafter stretching the film transversely in the tenter frame from 3.2 to 3.5 times its width while such film is at a temperature of between about 88° and 90° C.; and cooling the film below 78° C. without stretching or relaxation.

* * * * *